United States Patent [19]

Pasternak

[11] Patent Number: 4,985,138

[45] Date of Patent: Jan. 15, 1991

[54] PROCESS FOR TREATING A CHARGE CONTAINING DEWAXING SOLVENT AND DEWAXED OIL

[75] Inventor: Mordechai Pasternak, Spring Valley, N.Y.

[73] Assignee: Texaco Inc., White Plains, N.Y.

[21] Appl. No.: 433,237

[22] Filed: Nov. 8, 1989

[51] Int. Cl.$^5$ .............................................. C10G 73/04
[52] U.S. Cl. ..................................... 208/308; 208/33; 210/651; 210/500.37; 210/638; 585/819
[58] Field of Search .................. 208/33, 308; 585/819; 210/651, 500.37, 638

[56] References Cited

U.S. PATENT DOCUMENTS

| | | | |
|---|---|---|---|
| 3,179,632 | 4/1965 | Hendrix | 260/78 |
| 3,822,202 | 7/1974 | Hoehn | 210/23 |
| 4,532,029 | 7/1985 | Black et al. | 208/308 |
| 4,532,041 | 7/1985 | Shuey et al. | 585/819 X |
| 4,571,444 | 2/1986 | Black et al. | 585/819 |
| 4,678,555 | 7/1987 | Wernick | 208/308 |
| 4,836,927 | 6/1989 | Wan | 210/651 |

*Primary Examiner*—Asok Pal
*Attorney, Agent, or Firm*—Robert A. Kulason; James J. O'Loughlin; Carl G. Seutter

[57] ABSTRACT

Dewaxed oil containing dewaxing solvent from solvent dewaxing is treated by contact with a separating membrane to yield a retentate containing increased content of dewaxed oil and decreased content of dewaxing solvent and a permeate which contains increased content of dewaxing solvent and decreased content of dewaxing oil—the membrane including a polyimine layer which has been cross-linked with polyisocyanate or poly(carbonyl chloride).

16 Claims, No Drawings

PROCESS FOR TREATING A CHARGE CONTAINING DEWAXING SOLVENT AND DEWAXED OIL

FIELD OF THE INVENTION

This invention relates to a process for treating a charge containing dewaxing solvent and dewaxed oil. More particularly it relates to use of membrane technology to separate dewaxing solvent from dewaxed oil.

BACKGROUND OF THE INVENTION

As is well known to those skilled in the art, hydrocarbon stocks used for the preparation of lubricating oil contain undesirable components which are removed during processing to permit attainment of a product which is characterized by desired properties. Typically a charge stock is subjected inter alia to a dewaxing operation which decreases the wax content and desirably lowers the pour point and the cloud point of the lubricating oil stock.

Dewaxing may be effected by mixing a dewaxing solvent, such as methyl ethyl ketone or methyl isobutyl ketone optionally in the presence of a hydrocarbon such as toluene or xylene, with the charge oil and cooling the mixture below the desired pour point, typically to minus 5° F.–minus 20° F., say minus 10° F., at which point wax precipitates. The wax is filtered; and the dewaxed oil-dewaxing solvent mixture is recovered.

This recovered mixture has classically been flashed to recover solvent-free lubricating oil stock and solvent which is free of lubricating oil.

Those skilled in the art have attempted to improve the economics of this process by utilizing membrane technology to separate dewaxing solvent from dewaxed oil. Illustrative of such prior art attempts may be the following:

U.S. Pat. No. 4,678,555 to Wernick discloses use of cellulose acetate membranes.

European Patent Application No. 0 125 907 A1 to Wight discloses use of a polyimide membrane containing —CO—N—linkages.

European Patent Application No. 0 220 753 A1 to Bitter et al discloses use of a halogen-substituted silicone membrane.

U.S. Pat. No. 4,617,126 to Funk et al discloses use of a polysulfone membrane.

Additional background may be obtained from the references set forth in these patents.

It is an object of this invention to provide a process for treating a charge containing dewaxing solvent and dewaxed oil. Other objects will be apparent to those skilled in the art.

STATEMENT OF THE INVENTION

In accordance with certain of its aspects, this invention is directed to a process for treating a charge containing dewaxing solvent and dewaxed oil which comprises passing said charge containing dewaxing solvent and dewaxed oil into contact with, as separating membrane, a non-porous separating polyimine layer which has been cross-linked with a polyisocyanate or with a poly(carbonyl chloride) cross-linking agent;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decrease content of dewaxing solvent.

DESCRIPTION OF THE INVENTION

The lube oil stocks which may be treated by dewaxing may include distillate stocks, deasphalted oils, raffinates from solvent extraction of distillate, hydrotreated oils, hydrocracked distillates, etc, etc. ranging in viscosity at 100° F. from about 30 SUS to 4000 SUS. Typically such a charge may be characterized by the following:

TABLE

| Property | Range | Preferred | Typical |
|---|---|---|---|
| ibp °F. | 590–900 | 600–800 | 675 |
| 50% bp °F. | 725–1100 | 800–900 | 850 |
| 90% bp °F. | 800–950 | 850–950 | 920 |
| Viscosity SUS/100 °F. | 35–3500 | 40–100 | 54.63 |
| 60 °F. | 50–10,000 | 100–400 | 348.7 |
| API Gravity | 20–30 | 22–29 | 25.8 |
| Sp. Gr 15° C./15° C. | 0.870–0.895 | 0.880–0.890 | 0.890 |
| Pour point °F. | 90–125 | 95–110 | 95+ |
| Flash Point °F. | 360–600 | 385–560 | 460 |
| Refractive Index @ 70° C. | 1.4720–1.4940 | 1.4755–1.4920 | 1.4840 |

This waxy oil charge (100 volumes) is mixed with 100–1000 volumes preferably 200–500 volumes, say 300 volumes (depending on the viscosity grade and wax content of the feedstock) of ketone dewaxing solvent—such as acetone or preferably methyl ethyl ketone or methyl isobutyl ketone optionally diluted with a hydrocarbon solvent to produce dewaxing solvent. In a preferred embodiment, there may be added to 100 volumes of waxy oil charge, dewaxing solvent containing 50–75 volumes of ketone such as methyl ethyl ketone plus 50–25 volumes of a hydrocarbon solvent such as toluene or xylene. The mixture is cooled to minus 5° F.–minus 20° F., say minus 10° F. during which cooling, solid wax precipitates from the waxy oil charge. Typically a mid-continent distillate may be cooled to minus 10° F. to obtain a 0° F. pour point 100 neutral oil. Wax is filtered in a rotary vacuum filter to yield a dewaxed oil filtrate.

In accordance with practice of the process of this invention, this filtrate, containing dewaxing solvent and dewaxed oil, is passed into contact with, as a separation membrane, a non-porous separating polyimine membrane layer which has been cross-linked with a polyisocyanate or with a poly (carbonyl chloride) cross-linking agent.

THE MEMBRANE ASSEMBLY

Practice of the process of this invention may be carried out by use of a composite structure which in one preferred embodiment may include (i) a carrier layer which provides mechanical strength, (ii) a porous support layer, and (iii) a separating layer across which separation occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous., woven or non-woven. In the preferred embodiment, the carrier layer may be a porous, flexible, woven fibrous polyester. A typical polyester carrier layer may be formulated of non-woven, thermally-bonded strands.

THE POROUS SUPPORT LAYER

The porous support layer (typically an ultra-filtration membrane) which may be used in practice of this invention is preferably formed of polyacrylonitrile polymer. Typically the polyacrylonitrile may be of thickness of 40-80 microns, say 50 microns and is preferably characterized by a pore size of less than about 500A and typically about 200A. This corresponds to a molecular weight cut-off of less than about 50,000, typically about 40,000.

THE SEPARATING LAYER

The separating layer which permits attainment of separation in accordance with the process of this invention includes a non-porous film .or membrane of 0.2-1.5 microns, say about 0.5 microns of a polyimine polymer of molecular weight $\overline{M}_n$ of about 40,000-100,000, say about 60,000 (prior to cross-linking), which is cross-linked by urea or amide linkages.

The separating layer may be prepared by crosslinking a polyimine polymer in situ.

In the preferred embodiment, the polyimine polymer is cross-linked in situ. Polyimine polymers are characterized by the presence of recurring -N-R''- groups as integral parts of the main polymer chain. Typical structural formulae of linear polyimines may be represented as $$H_2N-R''[N-R'']_n-NH_2$$
$$\phantom{H_2N-R''[}|$$
$$\phantom{H_2N-R''[N}H$$

wherein n represents the degree of polymerization or number of recurring groups in the polymer chain.

In the above formula, R'' may preferably be a hydrocarbon group selected from the group consisting of alkylene, aralkylene, cycloalkylene, arylene, and alkarylene, including such radicals when inertly substituted. When R'' is alkylene, it may typically be methylene, ethylene, n-propylene, iso-propylene, n-butylene, i-butylene, sec-butylene, amylene, octylene, decylene, octadecylene, etc. When R'' is aralkylene, it may typically be benzylene, beta-phenylethylene, etc. When R'' is cycloalkylene, it may typically be cyclohexylene, cycloheptylene, cyclooctylene, 2-methylcycloheptylene, 3-butylcyclohexylene, 3-methylcyclohexylene, etc. When R'' is arylene, it may typically be phenylene, naphthylene, etc. When R is alkarylene, it may typically be tolylene, xylylene, etc. R'' may be inertly substituted i.e. it may bear a non-reactive substitutent such as alkyl, aryl, cycloalkyl, ether, etc. typically inertly substituted R'' groups may include 3-methoxypropylene, 2-ethoxyethylene, carboethoxymethylene, 4-methylcyclohexylene, p-methylphenylene, p-methylbenzylene, 3-ethyl-5-methylphenylene, etc. The preferred R'' groups may be phenylene or lower alkylene, i.e. $C_1-C_{10}$ alkylene, groups including e.g. methylene, ethylene, n-propylene, i-propylene, butylene, amylene, hexylene, octylene, decylene, etc. R'' may preferably be phenylene or ethylene $-CH_2CH_2-$.

Illustrative polyimine polymers include those of molecular weight $\overline{M}_n$ of 40,000-100,000, say 60,000.

Suitable polyimines may include the following, the first listed being preferred:

TABLE

A. Cordova Chemical Company Corcat P-600 brand of polyethyleneimine resin membrane ($\overline{M}_n$ of 60,000) in 33 w% aqueous solution—Brookfield viscosity @ 25° C. of 5000 cP, Sp.Gr @ 25° C. of 1.04-1.06, and pH of 10-11, having the formula

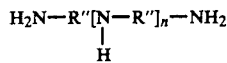

wherein R is H or $(CH_2CH_2N)_x$ (containing 30% primary, 40% secondary, and 30% tertiary amines)

B. Dow Chemical Co Tydex 12 brand of polyethyleneimine membrane ($\overline{M}_n$ of 50,000) in 30w% aqueous solution having the same formula as the Corcat p-600 membrane.

The polyethyleneimine resin in 0.01-1w% aqueous solution, say 0.1 w% concentration is deposited on the porous support layer over 1-5 minutes, say 2 minutes, drained, and then interfacially cross-linked.

Interfacial cross-linking of the preformed polyimine polymer may be effected by contact with, as cross-linking agent.

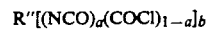

When the isocyanate cross-linking agent R'' $(NCO)_b$ is employed, the cross-linking forms urea bonds. When the carbonyl chloride cross-linking agent R'' $(COCl)_b$ is employed, the cross-linking forms amide bonds.

The cross-linking agent R'' $[(NCO)_a (COCl)_{1-a}]_b$, wherein a is 0 or 1 and b is an integer greater than 1, may be a polyisocyanate when is 1. When is 0, the cross-linking agent may be a poly (carbonyl chloride). Preferably is 1 and b is 2 i.e. the preferred cross-linking agent is a diisocyanate. It will be apparent to those skilled in the art when b is 2, R'' may be for example alkylene. When b is greater than 2, e.g. 3, it is obvious that the above definition of R'' as e.g. alkylene is for convenience; and the actual hydrocarbon residue will have more than two relevant valences.

The preferred polyisocyanates (i.e. monomeric compounds bearing a plurality of —NCO isocyanate groups) may include those which contain an aromatic nucleus, typically a toluene diisocyanate or a phenylene diisocyanate.

In practice of this aspect of the invention, cross-linking is effected by contacting the surface of the porous support layer with a 0.1 w%–0.8w%, say 0.4w% solution of cross-linking agent in solvent, typically hydrocarbon such as hexane. Contact may be at 20° C.–40° C., say 25° C. for 15–60 seconds, say 15 seconds.

Thereafter the membrane may be cured at 110° C.–150° C., say 125° C. for 10–20 minutes, say 15 minutes.

THE COMPOSITE MEMBRANE

It is a feature of this invention that it may utilize a composite membrane which comprises (i) a carrier layer characterized by mechanical strength, for supporting a porous support layer and a separating layer (ii) a porous support layer such as a polyacrylonitrile membrane of 10–80 microns and of molecular weight cutoff of 25,000–100,000, and (iii) as a non-porous separating layer a polyimine of molecular weight $\overline{M}_n$ of 40,000–100,000, which has been cross-linked with a polyisocyanate or a poly(carbonyl chloride).

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fiber. In this embodiment, the polyacrylonitrile porous support layer may be extruded as a fine tube with a wall thickness of typically 0.001–0.1 mm. The extruded tubes are passed through a bath of polyethyleneimine which is cross-linked and cured in situ. A bundle of these tubes is secured (with an epoxy adhesive) at each end in a header; and the fibers are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

PRESSURE DRIVEN PROCESS

It is a feature of the non-porous cross-linked polyimine separating layer that it is found to be particularly effective when used in a pressure driven process. In a pressure driven process, a charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

In practice of the process of this invention, the charge containing dewaxing solvent and dewaxed oil in liquid phase typically at 20° C.–40° C., say 25° C. may be passed into contact with the non-porous separating layer of the membrane of this invention. A pressure drop of about 500–1000 psi, say 800 psi is commonly maintained across the membrane. The feed or charge side of the membrane is at pressure sufficient to drive permeate across the membrane and commonly about 800 psig; and the permeate or discharge side of the membrane is at about atmospheric pressure. The feed is passed over the surface (ca three inches in diameter in one embodiment) of the membrane at a rate (e.g. of about 1200 ml/min) which minimizes the possibility of concentration polarization.

The permeate which passes through the membrane includes increased content of dewaxing solvent and decreased content of dewaxed oil; and the retentate includes increased content of dewaxed oil and decreased content of dewaxing solvent.

Typically when the charge to the membrane contains (per 100 parts of oil) 100–1100, preferably 200–600 parts, say 600 parts of dewaxing solvent, the permeate may be found to contain 0.5–2 parts, preferably 0.5–1, say 0.6 parts of dewaxing solvent.

Permeate is recovered in liquid phase.

Separation may typically be carried out at a flux of 1–70, say 16 kilograms per square meter per hour. Typically the units may have a rejection of more than 80% and commonly 95%–99.7%, say 96.9%.

Rejection % =

$$\frac{(\text{Feed Concentration} - \text{Permeate Concentration})}{\text{Feed Concentration}} \times 100.$$

Practice of the process of this invention will be apparent to those skilled in the art from the following examples wherein, as elsewhere in this specification, all parts are parts by weight unless otherwise stated. An asterisk (*) indicates a control example.

DESCRIPTION OF SPECIFIC EMBODIMENTS

Example I

In this example which represents the best mode of carrying out the process of this invention, the carrier layer is the woven polyester backing described supra. The porous support layer is the commercially available of polyacrylonitrile (PAN) produced by Gemeinschaft Fur Trenntechnik (GFT).

The polyethyleneimine PEI separating layer is fabricated from the Corcat P-600 brand of polyethyleneimine PEI of the Table supra ($\overline{M}_n$ of 60,000). This 33w% aqueous solution is diluted to 0.1 w% by addition of water. This solution is deposited on the porous support layer over 2 minutes and is then interfacially cross-linked.

The assembly containing the preferred microporous polyacrylonitrile supra as porous support layer and the woven polyester backing supra as carrier layer (total area of ca 30 cm$^2$) is contacted for two minutes with an excess of the diluted aqueous solution of polyethyleneimine. Excess solution is removed by holding the membrane assembly in a vertical position in air for one minute.

The assembly is then immersed in cross-linking agent (0.6 w% 2;4 toluene diisocyante TDI in hexane) for 15 seconds during which time cross-linking occurs. The membrane assembly is then heat cured at 80° C. for 15 minutes.

This membrane (three inch diameter circle) is mounted in a standard cell. There is admitted to the cell and to the non-porous polyethyleneimine separating layer a charge containing one part by weight of dewaxed oil and 5 parts by weight of methyl ethyl ketone.

Separation is carried out at a charge (and retentate) pressure of about 800 psig. Permeate pressure is atmospheric. Selectivity is measured and reported as % Rejection which is calculated as 100 × (the quantity of dewaxed oil in the feed minus the quantity of dewaxed oil in the permeate) divided by the quantity of dewaxed oil in the feed. Clearly a higher selectivity is desired, as this means that the retentate desirably contains less dewaxing solvent and the permeate desirably contains more solvent. Flux is measured as kilograms per square meter per hour (kmh).

In this example, the selectivity is 96.9% rejection and the flux is 16.1 kmh.

Examples II–XX

In this series of Examples, the procedure of Example I is duplicated except (i) In Examples II-VI, the concentration of TDI cross-linking agent is 0.4w% (rather than 0.6w% as in Example I);

(ii) In Examples VII-X, the concentration of TDI cross-linking agent is 0.6w%

(iii) In Example XII, the concentration of TDI cross-linking agent is 1.0w% (rather than 0.6w% as in Example I);

(iv) In Example XIII–XVIII, the cross-linking agent is hexamethylene diisocyanate HDI—at a concentration of 0.4w% in hexane solution in Examples XIII–XV and at a concentration of 0.6w% in hexane solution in Examples XVI–XVIII.

(v) In Example XIX, the cross-linking agent is a 0.1w% hexane solution of isophthaloyl chloride (IPC);

(vi) In Example XX, the cross-linking agent is a 0.1w% hexane solution of suberoyl dichloride (SDC);

(vii) In Examples III, V, VIII, and X, the pressure of charge liquid is 600 psig.

(viii) In Examples XI-XII, the porous support layer was the DUY-L brand of polyacrylonitrile of the Daicel Co, having a molecular weight cut-off of 40,000.

TABLE

| Example | Charge Weight Ratio Oil:MEK | Selectivity % Rejection | Flux (kmh) |
|---|---|---|---|
| II | 1:2 | 96.4 | 10.8 |
| III | 1:3 | 96.9 | 7.4 |
| IV | 1:3 | 97.3 | 10.1 |
| V | 1:5 | 94.3 | 9.3 |
| VI | 1:5 | 95.1 | 13.5 |
| VII | 1:2 | 95.8 | 12.5 |
| VIII | 1:3 | 98.4 | 9.5 |
| IX | 1:3 | 97.3 | 12.7 |
| X | 1:5 | 94.3 | 11.4 |
| XI | 1:5 | 77 | 71 |
| XII | 1:5 | 71 | 91 |
| XIII | 1:2 | 91 | 1.9 |
| XIV | 1:3 | 87 | 2.0 |
| XV | 1:5 | 89 | 3.4 |
| XVI | 1:2 | 89 | 3.4 |
| XVII | 1:3 | 85 | 4.6 |
| XVIII | 1:5 | 89 | 5.7 |
| XIX | 1:5 | 48 | 9.6 |
| XX | 1:5 | 48 | 2.9 |

From the above Examples, the following conclusions may be drawn:

(i) It is possible to achieve (Example VIII) a Selectivity as high as 98.4% rejection;

(ii) it is possible to achieve (Example XII) a Flux as high as 91 kmh;

(iii) best results (Example I) (a balance between high Selectivity and high Flux) appear to give Selectivity of 96.9 and a Flux of 16.1;

(iv) use of cross-linking agents with an aromatic backbone (e.g. TDI) gives membranes of better Selectivity and Flux than those with an aliphatic backbone (e.g. HDI). Compare for example Examples VII and XVI.

(v) Use of cross-linking agents with isocyanate NCO functionality gives better Selectivity and Flux than cross-linking agents with carbonyl chloride COCl functionality. Compare for example Examples I and XIX–XX.

Examples XXI–XXVIII

In this series of Examples, the procedure of Example I is duplicated except that the charge contains methyl isobutyl ketone (MIBK) instead of MEK.

The cross-linking agent is 0.4w% TDI in Example XXI, 0.6w% TDI in Example XXII, 0.4w% HDI in Examples XXIII–XXV and 0.6w% HDI in Examples XXVI–XXVIII.

TABLE

| Example | Charge Weight Ratio Oil:MIBK | Selectivity % Rejection | Flux (kmh) |
|---|---|---|---|
| XXI | 1:2 | 89 | 1.3 |
| XXII | 1:2 | 90 | 1.3 |
| XXIII | 1:2 | 84 | 1.2 |
| XXIV | 1:3 | 82 | 1.2 |
| XXV | 1:5 | 75 | 1.1 |
| XXVI | 1:2 | 80 | 1.7 |
| XXVII | 1:3 | 78 | 2.0 |

TABLE-continued

| Example | Charge Weight Ratio Oil:MIBK | Selectivity % Rejection | Flux (kmh) |
|---|---|---|---|
| XXVIII | 1:5 | 74 | 2.5 |

Examples XXIX-XXXIX

In this series of examples, the procedure of Example I is carried out (except as hereinafter noted) utilizing a charge containing equal parts by weight of dewaxed lubricating oil and methyl ethyl ketone (MEK) and toluene. This is typical of the dewaxed oil recovered from the wax filter of a commercial dewaxing unit utilizing MEK-toluene.

Separation is carried out at room temperature at pressure of 400-800 psig and a high feed rate of 1200 ml/min to minimize concentration polarization.

In each case, the carrier layer and the porous support layer are as in Example I, except that in Example XXXIX, the porous support layer is the DUY-L brand of polyacrylonitrile of Examples XI-XII and molecular weight cut-off of 40,000 of the Daicel Company. The separating layer is the same polyethyleneimine layer as in Example I except that it is fabricated on top of the PAN support layer under various fabrication conditions. In Example XXIX-XXXIX, the cross-linking agent is toluene diisocyanate TDI in hexane. The concentration of TDI in hexane is 0.1w% in Examples XXIX-XXXII; 0.2w% in Examples XXXIII-XXXIV; 0.4w% in Examples XXXV-XXXVI and XXXIX, and 0.6w% in Examples XXXVII-XXXVIII. Residence time of contacting with cross-linking agent is 15 seconds except for Example XXXII in which it is 60 seconds. All membranes are cured at 80° C. except for those of Example XXIX (60° C.) and Example XXX (100° C.).

Pressure of operation is 800 psig except for Examples XXXIII (400 psig) and XXXV and XXXVII (600 psig).

TABLE

| Example | Selectivity (% Rejection) | Flux (kmh) |
|---|---|---|
| XXIX | 86 | 0.6 |
| XXX | 70 | 1.3 |
| XXXI | 86 | 1.9 |
| XXXII | 69 | 0.5 |
| XXXIII | 99.7 | 0.7 |
| XXXIV | 99.7 | 1.7 |
| XXXV | 99.7 | 1.0 |
| XXXVI | 99.7 | 1.4 |
| XXXVII | 99.4 | 0.9 |
| XXXVIII | 99.4 | 1.2 |
| XXXIX | 71 | 71 |

From the above table, it is apparent that the best membrane (yielding 99.7% rejection and Flux of 1.7 kmh at 800 psig) is attained by use of 0.1w% PEI crosslinked by 0.2w% TDI in an interfacial reaction over 15 seconds.

Use of the Diacel Duy-L brand of polyacrylonitrile membrane support substantially increases the Flux to 71 kmh although the Selectivity drops substantially to 71%.

It is also noted that higher pressure yields higher Flux with little or no change in Selectivity. Compare for example Example XXXIII (0.7 kmh at 99.7% Sel) and Example XXXIV (1.7 kmh at 99.7% Sel).

Examples XL-LVII

In this series of Examples, the procedure of Examples XXIX-XXXIX is followed except that the crosslinking agents are varied. In Examples XL-XLV, the cross-linking agent is hexamethylene diisocyanate HDI an aliphatic compound. In Examples XLVI-XLVII, the cross-linking agent is isophthaloyl chloride IPC, an aromatic compound. In Examples XLVIII-XLIX, the cross-linking agent is suberoyl dichloride SDC, an aliphatic compound. In Examples, L-LI, the cross-linking agent is adipoyl chloride APC an aliphatic compound. In Examples LII-LIII, the cross-linking agent is benzene tricarbonyl chloride BTC, an aromatic compound.

In Examples LIV-LV the cross-linking agent is a mixture of 0.2w% TDI and 0.2w% HDI. In Examples LVI-LVII, the cross-linking agent is 0.4w% TDI and 0.4w% HDI.

Pressure of operation is 800 psig in all examples except Examples XLIII (400 psig) and XLIV, LIV, and LVI (600 psig).

TABLE

| Example | Selectivity (% Rejection) | Flux (kmh) |
|---|---|---|
| XL | 86 | 3.4 |
| XLI | 86 | 7.4 |
| XLII | 97.4 | 6.4 |
| XLIII | 87 | 3.2 |
| XLIV | 95 | 4.5 |
| XLV | 98.7 | 5.4 |
| XLVI | 82 | 1.6 |
| XLVII | 88 | 1.9 |
| XLVIII | 94 | 5.1 |
| XLIX | 85 | 6.8 |
| L | 78 | 8.5 |
| LI | 79 | 5.6 |
| LII | 74 | 0.9 |
| LIII | 76 | 0.8 |
| LIV | 95.1 | 3.4 |
| LV | 99.3 | 4.2 |
| LVI | 97.8 | 2.0 |
| LVII | 99.5 | 2.7 |

From the above Table it is apparent that aliphatic cross-linking agents (which yielded a less rigid barrier) give higher flux albeit at a slightly lower Selectivity.

It is also apparent that use of cross-linking agents having carbonyl chloride functionality (rather than isocyanate functionality) yields lower Selectivity and little improvement in Flux. The trifunctional cross-linking agent (Examples XLVI-XLVII) yields a less selective membrane with a lower Flux than did the membrane of e.g. Examples XLVI-XLVII, which are cross-linked by bifunctional agents containing carbonyl chloride and aromatic backbone.

A combination of two cross-linking agents (Examples LIV-LVII) with the preferred isocyanate functionality and a mix of aliphatic and aromatic backbones yielded a membrane with optimum performance—note particularly Example LV showing 99.3% Selectivity and 4.2 kmh Flux.

Although this invention has been illustrated by reference to specific embodiments, it will be apparent to those skilled in the art that various charges and modifications may be made which clearly fall within the scope of the invention.

I claim:

1. The process for treating a charge containing dewaxing solvent and dewaxed oil which comprises passing said charge containing dewaxing solvent and dewaxed oil into contact with, as separating membrane, a non-porous separating polyimine layer which has been cross-linked with a polyisocyanate or with a poly(carbonyl chloride) cross-linking agent;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane by thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

2. The process for treating a charge containing solvent and dewaxed oil as claimed in claim 1 wherein said polyimine, prior to cross-linking, has a molecular weight $\overline{M}_n$ of about 40,000–100,000.

3. The process for treating a charge containing solvent and dewaxed oil as claimed in claim 1 wherein said polyimine is a linear polyimine having the structure

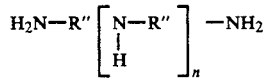

wherein R'' is an alkylene, aralkylene, alkarylene, cycloalkylene, or arylene hydrocarbon group and n is the number of recurring groups in the molecule.

4. The process for treating a charge containing solvent and dewaxed oil as claimed in claim 1 wherein said polyimine is a polyethylene imine.

5. The process for treating a charge containing solvent and dewaxed oil as claimed in claim 1 wherein said cross-linking agent is a polyisocyanate.

6. The process for treating a charge containing solvent and dewaxed oil as claimed in claim 1 wherein said cross-linking agent is toluene diisocyanate.

7. The process for treating a charge containing solvent and dewaxed oil as claimed in claim 1 wherein said cross-linking agent is a mixture of toluene diisocyanate and hexamethylene diisocyanate.

8. The process for treating a charge containing solvent and dewaxed oil as claimed in claim 1 wherein said cross-linking agent is a poly(carbonyl chloride).

9. The process for treating a charge containing solvent and dewaxed oil as claimed in claim 1 wherein said dewaxing solvent contains methyl ethyl ketone.

10. The process for treating a charge containing solvent and dewaxed oil as claimed in claim 1 wherein said dewaxing solvent contains methyl ethyl ketone and toluene.

11. The process for treating a charge containing solvent and dewaxed oil as claimed in claim 1 wherein said dewaxing solvent contains methyl isobutyl ketone.

12. The process for treating a charge containing solvent and dewaxed oil as claimed in claim 1 wherein said cross-linked polyimine separating membrane is supported on a polyacrylonitrile porous support layer.

13. The process for treating a charge containing dewaxing solvent, including methyl ethyl ketone and toluene, and dewaxed oil which comprises passing said charge containing dewaxing solvent, including methyl ethyl ketone and toluene, and dewaxed oil into contact with, as separating membrane, a non-porous separating polyimine layer which has been cross-linked with a mixture of hexamethylene diisocyanate and toluene diisocyanate as cross-linking agent;

maintaining a pressure drop across said membrane thereby forming a high pressure retentate containing increased content of dewaxed oil and decreased content of dewaxing solvent, including methyl ethyl ketone and toluene, and a low pressure permeate containing increased content of dewaxing solvent, including methyl ethyl ketone and toluene, and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent, including methyl ethyl ketone and toluene, and dewaxed oil and sufficient to drive permeate across said membrane by thereby maintaining said charge dewaxing solvent, including methyl ethyl ketone and toluene, and dewaxed oil and said retentate in liquid phase;

recovering said permeate containing increased content of dewaxing solvent, including methyl ethyl ketone and toluene, and decreased content of dewaxed oil; and recovering said retentate containing increased content of dewaxed oil and decreased content of dewaxing solvent, including methyl ethyl ketone and toluene.

14. The process for treating a charge containing dewaxing solvent, including methyl isobutyl ketone, and dewaxed oil which comprises passing said charge containing dewaxing solvent, including methyl isobutyl ketone, and dewaxed oil into contact with, as separating membrane, a non-porous separating polyimine layer which has been cross-linked with toluene diisocyanate cross-linking agent;

maintaining a pressure drop across said membrane thereby forming a high pressure retentate containing increased content of dewaxed oil and decreased content of dewaxing solvent, including methyl isobutyl ketone, and a low pressure permeate containing increased content of dewaxing solvent, including methyl isobutyl ketone, and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent, including methyl isobutyl ketone, and dewaxed oil and sufficient to drive permeate across said membrane by thereby maintaining said charge dewaxing solvent, including methyl isobutyl ketone, and dewaxed oil and said retentate in liquid phase;

recovering said permeate containing increased content of dewaxing solvent, including methyl isobutyl ketone, and decreased content of dewaxed oil; and recovering said retentate containing increased content of dewaxed oil and decreased content of dewaxing solvent, including methyl isobutyl ketone.

15. The process for treating a charge containing dewaxing solvent, including methyl ethyl ketone, and dewaxed oil which comprises passing said charge containing dewaxing solvent and dewaxed oil into contact with, as separating membrane, a non-porous separating polyimine layer which has been cross-linked with toluene diisocyanate cross-linking agent;

maintaining a pressure drop across said membrane thereby forming a high pressure retentate containing increased content of dewaxed oil and decreased content of dewaxing solvent, including methyl ethyl ketone and a low pressure permeate containing increased content of dewaxing solvent, including methyl ethyl ketone and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent, including methyl ethyl ketone and dewaxed oil and sufficient to drive permeate across said membrane by thereby maintaining said charge dewaxing solvent, including methyl ethyl ketone and dewaxed oil and said retentate in liquid phase;

recovering said permeate containing increased content of dewaxing solvent, including methyl ethyl ketone and decreased content of dewaxed oil; and recovering said retentate containing increased content of dewaxed oil and decreased content of dewaxing solvent, including methyl ethyl ketone.

16. A membrane, characterized by its ability to treat a charge containing dewaxing solvent and dewaxed oil to permit attainment therefrom of retentate containing increased content of dewaxed oil and decreased content of dewaxing solvent and of permeate containing increased content of dewaxing solvent and decreased content of dewaxed oil, which comprises a non-porous separating polyimine membrane which has been cross-linked with a polyisocyanate or with a poly(carbonyl chloride) cross-linking agent.

* * * * *